United States Patent
Graf et al.

(10) Patent No.: US 8,388,444 B2
(45) Date of Patent: Mar. 5, 2013

(54) ELECTRONIC GAMING MACHINE

(75) Inventors: Johann F. Graf, Gumpoldskirchen (AT); Marek Gawel, Traiskirchen (AT); Alexander Legat, Vienna (AT)

(73) Assignee: Novomatic AG (AT)

( * ) Notice: Subject to any disclaimer, the term of this patent is extended or adjusted under 35 U.S.C. 154(b) by 100 days.

(21) Appl. No.: 12/715,265

(22) Filed: Mar. 1, 2010

(65) Prior Publication Data

US 2010/0197397 A1     Aug. 5, 2010

Related U.S. Application Data

(63) Continuation of application No. PCT/EP2008/007289, filed on Sep. 5, 2008.

(30) Foreign Application Priority Data

Sep. 7, 2007   (DE) .......................... 10 2007 042 632

(51) Int. Cl.
*A63F 13/00*     (2006.01)
(52) U.S. Cl. ................. 463/31; 463/16; 463/30; 463/46
(58) Field of Classification Search .................... 463/16, 463/20, 30, 31, 34, 46
See application file for complete search history.

(56) References Cited

U.S. PATENT DOCUMENTS

| | | | | |
|---|---|---|---|---|
| 6,146,278 | A * | 11/2000 | Kobayashi | 463/53 |
| 7,780,534 | B2 * | 8/2010 | Wudtke | 463/46 |
| 2002/0065132 | A1 | 5/2002 | Stephan | |
| 2002/0107075 | A1 | 8/2002 | Stephan | |
| 2002/0123381 | A1 * | 9/2002 | Akeripa | 463/36 |
| 2005/0020348 | A1 * | 1/2005 | Thomas et al. | 463/20 |
| 2005/0113172 | A1 * | 5/2005 | Gong | 463/42 |
| 2006/0030406 | A1 * | 2/2006 | Seeling et al. | 463/31 |
| 2007/0111776 | A1 * | 5/2007 | Griswold et al. | 463/16 |
| 2007/0267809 | A1 * | 11/2007 | Balzano | 273/139 |

FOREIGN PATENT DOCUMENTS

| | | |
|---|---|---|
| CN | 2630978 | 8/2004 |
| DE | 199319697 | 3/1994 |
| DE | 19936498 | 2/2001 |

(Continued)

OTHER PUBLICATIONS

German Patent Application No. 10 2007 042 632.3 filed Sep. 7, 2007 in the name of Novomatic AG, Search Report mailed Jun. 24, 2008.

(Continued)

*Primary Examiner* — James S McClellan
(74) *Attorney, Agent, or Firm* — Levine Bagade Han LLP

(57) ABSTRACT

The present invention relates to a gaming machine and/or entertainment machine, in particular in the form of slot machines and/or gambling machines operable by coins and/or by monetary equivalents, having a plurality of screens for the presentation of information, in particular of game contents and/or of game information, which are directed toward a machine operating position, and having a control device for the control of the screens and/or for the control of game procedures. It is proposed to arrange a plurality of screens staggered behind one another and overlapping one another so that the viewing window onto at least one screen remains behind the actual screen surface of the screen with respect to format and/or size in order to accommodate a maximum number of screens in a compact arrangement, on the one hand, and in order not to be restricted to the desired field of view with respect to the formats of the screens to be used. Provision is made in accordance with the invention that at least one of the screens is arranged partly or fully hidden behind at least one further screen viewed from the machine operating position.

26 Claims, 1 Drawing Sheet

FOREIGN PATENT DOCUMENTS

| | | |
|---|---|---|
| EP | 1865473 | 12/2007 |
| WO | WO 2005/041139 | 5/2005 |
| WO | WO 2005/102107 | 11/2005 |
| WO | WO 2007/048610 | 5/2007 |
| WO | WO 2008/057588 | 5/2008 |

OTHER PUBLICATIONS

International Patent Application No. PCT/EP2008/007289 filed Sep. 5, 2008 in the name of Novomatic AG, International Search Report mailed Dec. 3, 2008.

* cited by examiner

ELECTRONIC GAMING MACHINE

CROSS-REFERENCE TO RELATED APPLICATIONS

This application is a continuation of PCT Application No. PCT/EP2008/007289, filed 5 Sep. 2008 which claims priority to German Application No. 10 2007 042 632.3, filed 7 Sep. 2007, both of which are incorporated by reference herein in their entireties.

BACKGROUND OF THE INVENTION

1. Field of the Invention

The present invention relates to a gaining machine and/or entertainment machine, in particular in the form of slot machines and/or gambling machines operable by coins and/or by monetary equivalents, having a plurality of screens for the presentation of information, in particular of game contents and/or of game information, which are directed toward a machine operating position, and having a control device for the control of the screens and/or for the control of game procedures.

Such gaming machines can, for example, form electronically designed reel gaming machines in which a plurality of rotating reels having different game symbols are presented in a rotating manner in the viewing windows of the display fields and game winnings are dispensed when the reels having the same game symbols come to a stop along a winning line. In this respect, a control panel having a plurality of control buttons is provided beneath the screens, approximately at the level of the stomach of the player standing in front of the machine, said control buttons being operable by hand and serving, among other things, to set the rotating reels into operation and/or to stop them.

2. Description of Related Art

It has already been proposed to increase the playing appeal in such gaming machines to install a plurality of screens to be able to have different games run simultaneously or to be able to display further information, in addition to a running game, for example on other game options of the machine or the status of other gambling games, so that the player can obtain additional entertainment from the respective other screen during less exciting game periods.

A gaming machine of the initially named kind is known, for example, from WO 2005/041139 A1 in which the display apparatus includes two large-area screens which are inclined with respect to one another and on which games to be played with the gaming machine can be displayed. A control panel with a plurality of operating buttons which can be operated by hand, which control different game functions or game parameters and which inter alia include a start button to set a game into motion is also provided beneath the display apparatus comprising screens.

It has also already been proposed with such gaming machines to use more than two screens to increase the playing appeal. The number of screens can, however not be increased as desired with a given total size of the machine housing. In addition, with an arrangement of large screens, the field of view to be surveyed overall is very large, which can no longer or not easily be perceived simultaneously in a relaxed manner without looking to and fro and which ultimately cannot only result in physical fatigue of the player, but can also bring along a reduction in the playing appeal and in concentration. In addition, with slot machines having a plurality of large screens which are arranged above one another, the plurality of games ongoing at the same time are not able to be followed ideally in the player position predetermined by the named control panel.

It is therefore the underlying object of the present invention to provide an improved electronic gaming machine, in particular a slot machine and/or gambling machine which avoids disadvantages of the prior art and further develops it in an advantageous manner. An increased playing appeal should in particular be achieved with a limited machine size without obtaining this with fatigue problems or concentration problems.

SUMMARY OF THE INVENTION

This object is achieved in accordance with the invention by a gaming machine and/or entertainment machine in accordance with claim 1. Preferred embodiments of the invention are the subject of the dependent claims.

It is therefore proposed to arrange a plurality of screens staggered behind one another and overlapping one another so that the viewing window onto at least one screen remains behind the actual screen surface of the screen with respect to format and/or size in order to accommodate a maximum number of screens in a compact arrangement, on the one hand, and in order not to be restricted to the desired field of view with respect to the formats of the screens to be used. Provision is made in accordance with the invention that at least one of the screens is arranged partly or fully hidden behind at least one further screen viewed from the machine operating position. A large screen can hereby in particular be used which is customary with respect to its format, even if only a small strip should be produced as the field of view since the remainder of the screen surface, which is superfluous so-to-say, is hidden behind one or two front screens. The variability of the screen areas to be seen at the machine front allows a plurality of machine fronts to be designed in a varied manner with different appearances without a plurality of different screens. The hidden arrangement can in this respect not only be advantageous with regard to the costs for the third screen, but also particularly achieves a very surprising effect with respect to the playing appeal. The player can recognize that the hidden screen continues per se, whereby an emergence of representations from the hidden background occurs which is very realistic for the human eye. The player tries, so-to-say unconsciously, to see the hidden "more" of the screen. Apart from this, a further game or other interesting information can be displayed by the additional, partly hidden screen so that an additional entertainment incentive is achieved while the machine size remains limited.

The staggering of the screens behind one another can generally be arranged in different manners and can be adapted to the desired viewing windows of the machine front. In a further development of the invention, provision can advantageously be made that two screens are arranged above one another in a screen plane at the front viewed from the machine operating position and that the at least one screen arranged in a hidden manner is arranged behind the two named front screens in a rear screen plane, with the two front screens being spaced apart from one another so that the rear screen is visible in sections through a viewing window between the two front screens. The arrangement of the front screens in a front screen plane is in this respect not to be understood strictly in the mathematical sense such that the screens have to lie aligned in parallel in exactly one mathematical plane—which can nevertheless be provided for, but rather means that the screens at the front viewed in the direction of view of the machine operating position are arranged further toward the player and closer to the machine front side substantially at the same spacing level from the machine front, whereas the rear, hidden screen is arranged sunk deeper in the machine body. The named arrangement of the hidden screen in a viewing window preferably substantially broader than higher between the two screens which are disposed at the front and whose visible surface can advantageously be considerably larger, for example twice as large, as the viewing window for the rear screen produces a harmonious appearance of the machine front and allows game information or background information to be displayed in the smaller middle viewing window, i.e. on the rear, hidden screen, which can be important for both games which are running on the front screens. A good detectability can hereby be achieved irrespective of whether the/a game is just being followed in each case on the upper or on the lower of the two front screens.

To achieve good visibility of all screens from the machine operating position, advantageously at least two screens, preferably all screens, are arranged inclined at an obtuse angle to one another and are tilted at different angles to the horizontal toward the machine operating position. The screens can be increasingly tilted from the bottom to the top overall so that an obtuse angle is formed between each adjacent screen pair. In accordance with an advantageous embodiment of the invention, screens adjacent above one another can include an angle between 145° and 179°, preferably 165° and 175°, with optionally other screen arrangements also being able to be made depending on the machine configuration.

Particularly advantageous effects which especially promote the playing appeal can be achieved with the screen arrangement hidden behind one another if, in a further development of the invention, the viewing window of the hidden screen, i.e. the non-hidden section of the rear screen, can be changed so that the hidden screen can be seen now more and now less. For this purpose, in a further development of the invention, the gaming machine and/or entertainment machine is provided with a covering adjustment apparatus to change the covering of the rear screen with respect to the size and/or position of the hidden section.

The covering adjustment device can in this respect generally be formed in different manners. For example, a faceplate arranged before the hidden screen could be provided which bounds the viewing window to the rear screen and can be designed to be adjustable to be able to change the viewing window, for example, can be increased/reduced in size or changed in its position to increase/reduce the size of the visible screen part or to displace it. In particular a movable support for at least one screen can preferably be provided by means of which at least one of the screens is supported movably relative to at least one further screen such that the covering of the rear screen can be changed with respect to the size and/or position of the hidden section. The covering of the screens can be changed by moving the screen in the direction transverse to the visual axis, whereby the section of the rear, fully or partly hidden screen to be seen can be changed.

The covering adjustment apparatus can in particular have a vertical adjustment apparatus for the adjustment of the height of the rear, hidden screen relative to the at least one front screen. In particular the visible image section of the hidden screen can hereby be changed. Alternatively or additionally, the covering adjustment apparatus can have a vertical adjustment apparatus for the adjustment of the height of at least one front screen relative to the at least one rear screen and preferably also relative to the further front screen. In particular the viewing window between the two front screens onto the rear screen can hereby be displaced and also increased or reduced in size so that the visible section of the rear screen can be increased and reduced in size and the rear screen can be made more or less visible. The covering adjustment device therefore advantageously has a spacing adjustment apparatus for the moving apart/together of two front screens and for the increasing/decreasing in size of the viewing window onto the hidden rear screen formed between the named two front screens.

In a very simple design of the invention, a manually actuable adjustment apparatus for the adjustment of the position of the screens relative to one another can be provided, for example a pivot lever for the moving up and down of the rear screen. Preferably, however, an actuating drive, preferably an electric motor, actuable by external energy is provided for the adjustment of the position of at least one screen relative to at least one further screen.

The control of the screen adjustment and thus of the visible section of the rear screen can be formed in different manners. It is particularly advantageous with respect to the increase in the playing appeal if, in a further development of the invention, the control device has control means for the automatic adjustment of the screen covering in dependence on the course of the game. In particular specific game sections or game processes and particular game situations can hereby be emphasized by changing the visible region of the hidden screen or movements of the named rear screen so that the attention of the machine user is directed to the rear screen which is per se only visible with restrictions.

The control means can advantageously have winnings display means for the enlarging of the visible screen section and/or a cyclic movement to and fro of the hidden screen on the achieving of winnings or on the reaching of a decisive game situation, for example just before the stopping of the reels. If, for example, the jackpot of the game running on the rear, hidden screen is won, the control device can move the rear screen joggling to and fro and/or move the front screens further apart to show the rear screen more or fully temporarily by a corresponding control of the actuating motor or the plurality of actuating motors. The hiding of the rear screen or of its visible screen section can also be changed on the occurrence of other game situations to entertain a machine operator in the best possible manner, with provision also being able to be made, for example, to hide the hidden screen fully temporarily, for example if after starting a new game on this screen, a less exciting game situation is temporarily shown and/or if the decisive game phase is just being reached on one of the front screens to which the full attention of the player should be given.

Alternatively or additionally to the named automatic control of the screen hiding, the gaming machine and/or entertainment machine can also have a manual control of the covering adjustment device, with advantageously an input means actuable by a machine operator, in particular a suitable operating button, being provided for the adjustment of the screen covering. A preselection of the screen section of the hidden screen to be seen can hereby be made, for example, which is then modified, for example, by the automatic control in dependence on the game situation. Provision can also be made that the manual control has, so-to-say, priority over the automatic control means such that, on actuation of the manual input means, the arrangement respectively just desired by the player is moved to irrespective of the automatic control of the relative screen arrangement with respect to one another which takes place per se.

In this respect, the manual input means can have generally different characteristics. To facilitate the operability independently of the player position, provision can be made in a further development of the invention that the input means have a foot pedal for the adjustment of the relative location of the screens to one another. In this respect, in accordance with a variant, the foot pedal can advantageously form a unit which is formed separately from the machine housing and which can be located at different positions at the floor relative to the machine housing. The foot pedal in this respect allows a tele-control in the manner of a remote control of the screen hiding from different points. The player can select the pedal position himself. The data transfer from the foot pedal to the control device can in this respect take place by cables, but also in a cable-less manner, e.g. via a Bluetooth interface. A considerably better machine operation can be achieved by such a pedal arranged close to the floor. The player is in particular no longer tied to the control panel having the manually actuable operating buttons; he can move back, for example to view the game display from a larger distance, in particular with large-area screens, or he can move to and fro in front of the gaming machine while still remaining in the range of the foot pedal so that he can actuate the gaming machine. In addition, the playing appeal is hereby considerably increased since the gaming machine can be operated in a more versatile manner. A substantial advantage is furthermore that the machine operation is also simplified or even made possible at all for physically disabled persons, in particular with disabilities in the arm area. Furthermore, the hands can be used for other things such as eating, drinking or smoking without having to interrupt the game. In accordance with an advantageous embodiment of the invention, alternatively or additionally to a remote control foot pedal, a foot pedal can also be arranged at the machine housing, at its front side, advantageously close to the floor at the lower section of the machine housing.

The gaming machine can advantageously also have a knee pedal to change the screen hiding. A player standing or also sitting on a corresponding stool in front of the gaming machine can hereby also actuate the covering adjustment apparatus or trigger corresponding control commands in that he pushes against the knee button arranged in the knee region by moving his knee. It is hereby possible optionally to react even faster in order to view the screen larger for a short time if an interesting event occurs there.

Alternatively to such a foot pedal and/or to a knee pedal, the named input means can also have a manual button and/or a manual lever for the adjustment of the relative location of the screens to one another.

In a further development of the invention, the foot pedal and/or the knee pedal and/or the manual button cannot only be provided for the adjustment of the screen coverage, but rather also for the control of further machine functions. In accordance with a particularly advantageous embodiment of the invention, provision can in this respect in particular be made that the control device assigns different control functions to the foot pedal and/or to the knee pedal and/or to the manual lever at different times in a game.

Before a game or on an interruption of the game, the foot pedal and/or the knee pedal and/or the manual button can in particular form the start button for the starting or restarting of the game. If, in contrast, the game is running, the screen coverage can be influenced with the aid of the foot pedal or of the knee pedal or of the manual lever.

To improve the visibility of the screen arranged hidden despite its hidden arrangement, provision is made in an advantageous further development of the invention that at least one mirror is associated with the rear hidden screen which is aligned and arranged with respect to the machine operating position that at least a part of the image produced by the screen is visible in the mirror from the machine operating position. In this respect, the rear hidden screen is advantageously bordered laterally to the right and to the left by at least one respective mirror which is arranged inclined at an acute or obtuse angle to the screen surface of the named hidden screen. In this respect, the arrangement of the screen sunk lower in the machine body can in particular be utilized to provide the side walls in the viewing window or viewing passage leading to the screen with mirrors which allow the image generated by the hidden screen to appear larger than it actually is and/or to direct the visual axis to screen sections hidden per se, whereby the actual visible region is enlarged despite the hidden arrangement.

Different monitors can generally be used, with the screens being designed as flat screens, preferably as TFT monitors. In this respect, different screens can be designed differently, with all monitors advantageously being able to be large-screen TFT monitors and/or being able to have the same format.

The gaming machine and/or entertainment machine is designed in accordance with an embodiment of the invention as a so-called stand-alone machine, with the screens being arranged in a common machine housing which has a control panel for the actuation and/or control of the machine at the front side below the screen.

BRIEF DESCRIPTION OF THE DRAWINGS

The invention will be explained in more detail in the following with respect to preferred embodiments and to associated drawings. There are shown in the drawings.

DETAILED DESCRIPTION

Figure 1:
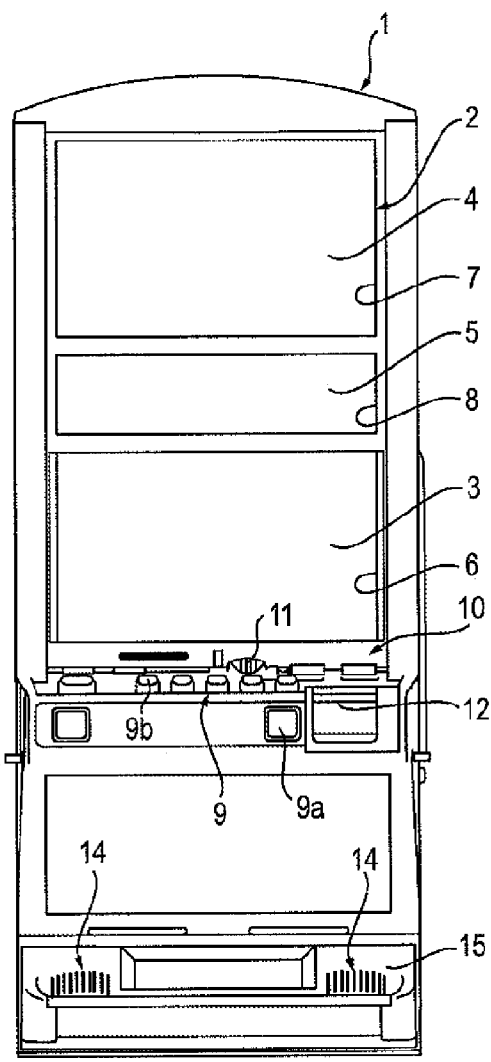
FIG. 1: a front view of an electronic slot machine having three screens of which the middle one is arranged partly hidden behind the front lower screen.

The gaming machine drawn in FIG. 1 forms a standing machine in the form of a stand-alone machine and comprises a machine housing 1 which is approximately head-high, which is roughly speaking of box shape and whose upper half serves the reception of a display apparatus 2 which comprises, in the drawn embodiment, two large-area screens 3 and 4 arranged above one another and one screen 5 to be seen sectionally between them. As FIG. 1 shows, the gaming machine housing 1 has in its front side 50 two cut-outs 6, 7 and 60 which include an obtuse angle with one another so that the screens 3, 4 and 5 arranged above one another are likewise tilted with respect to one another at an oblique angle to one another about a horizontal axis, cf. FIG. 2.

The gaming machine housing 1 has a control panel section 60 beneath the screens 3, 4 and 5 which projects toward the player and which extends over the total width of the machine housing 1 and is essentially box-shaped. The upper side of the control panel section 60 of the machine housing 1 is formed approximately planar and accommodates the control panel 10 which includes a plurality of control buttons 9 in the form of push buttons to be actuated by hand. In the embodiment drawn, the control buttons 9 are mechanical switches; however, it is understood that the control buttons 9 can also be actuable in accordance with other working principles; they can in particular be part of a touchscreen. In a manner known per se, the control panel section 60 can furthermore include a money input and/or output device 11 which can naturally be designed differently in a manner known per se and can, for example, also include a token and/or ticket module or an electronic card reading and writing device in addition to a coin and banknote module.

Specifically, the control panel 10 has a start button 9a arranged beside a handle 12 at the front side of the control panel section 60 as well as a plurality of operating buttons on the planar upper side, for example to increase the stake, to call up game information or to control further game functions, and also an operating button to adjust the location of the rear screen 5 relative to the other screens 4 and 5.

The games displayed on the screens 3, 4 and 5 are controlled by an electronic control device 13, preferably in the form of a computer, which is received in the interior of the machine housing 1 in its lower half. The control device 13, on the one hand, controls the display apparatus 2 and, on the other hand, communicates with the operating buttons 9 of the control panel 10. It is understood that the winnings output device is also controlled by the control device 13.

As FIG. 1 shows, the gaming machine of the drawn embodiment has, in addition to the manual buttons of the control panel 10, two foot pedals 14 which are arranged in the drawn embodiment at the front side 5 of the machine housing 1 at its base section. The two foot pedals 14 are in this respect connected to the control device 13 in order also to be able to enter control commands by foot, in particular also to be able to change the hiding of the rear screen 5 by foot.

Figure 2:
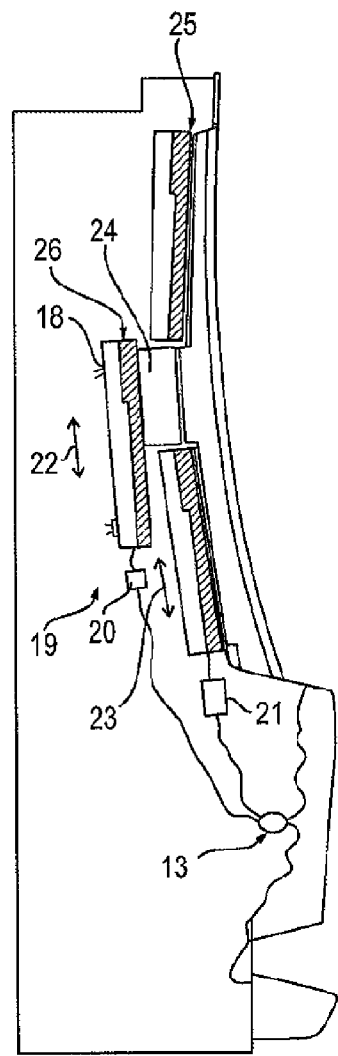
FIG. 2: a schematic side view of the electronic slot machine of FIG. 1 in a longitudinal section which shows the staggering of the screens behind one another.

As FIG. 2 shows, the screens 3, 4 and 5 are arranged offset and staggered behind one another so that the middle screen 5 extends partly behind the lower screen 3 and is partly hidden by it. In this respect, the two front screens are—roughly speaking—arranged substantially directly below or at the front side 50 of the machine in a front screen plane, whereas the hidden screen 5 is arranged offset deeper in the machine body in the direction of the visual axis toward the screen so that a part of its screen surface in the direction of the visual axis toward the screen is hidden behind the lower screen 3. A normal-format screen can be used by this hidden screen arrangement despite the unusually narrow (in the vertical direction), but wide viewing window or section 8. All three screens 3, 4, 5 advantageously have the same format. They can in particular be designed as flat screens, for example in the form of TFT monitors. In the drawn embodiment, the viewing window onto the middle screen 5 is more than three times wider than high, whereas the screens 3, 4 and 5 including the rear screen 5 to be seen through the named viewing window have a format whose width is admittedly larger than its height, but amounts to less than twice the named width, cf. FIGS. 1 and 2.

The rear screen 5 and/or the lower screen 3 can advantageously be supported with vertical changeability, which can be effected, for example, in each case by a support 18 in the form of a lateral sliding guide which guides the respective screen laterally at the machine housing or at a fixed rack or frame so that the screens 3 and 5 can each move transversely to the visual axis onto the respective screen, preferably approximately parallel to the plane defined by their screen surfaces.

A covering adjustment apparatus 19 can in this respect have actuating motors 20 and 21 which are associated with the screens 3 and 5 and/or their supports 18 to be able to move the screens by motor as the arrows 22, 23 in FIG. 2 indicate. The actuating motors 20 and 21 can in this respect be controlled in the initially named manner by the control device 13 in dependence on different operating parameters of the machine, in particular in dependence on the course of the game, and/or can be actuated by the previously named operating button 9b and/or the foot pedal 14 to change the field of view onto the hidden screen 5 in the named manner.

As FIG. 2 shows, in this respect the rear screen 5 or the viewing window onto the rear screen 5 disposed between the two front screens 3 and 4 is bordered by lateral mirrors 24 which are arranged and aligned such that they reflect the image generated by the screen 5 into the area of the eyes of the player on the intended machine operating position to be able to be seen from there. The upper section of the viewing window which so-to-say forms the upper window reveal can also be provided with a mirror to improve the visibility onto the rear screen or to give the impression of a larger image.

We claim:

1. An entertainment machine, comprising:
 a plurality of screens for the presentation of information, wherein the plurality of screens are directed toward a machine operating position, and
 a control device for the control of the screens and/or for the control of game procedures;
 wherein at least one of the screens is a rear screen, and wherein the rear screen is permanently arranged partly hidden behind at least one further screen, viewed from the machine operating position, and has a screen section visible from the machine operating position which screen section is outside said further screen, and wherein the further screen has a screen section outside of the position of the rear screen, viewed from the machine operating position.

2. The machine of claim 1, wherein the plurality of screens comprise two front screens arranged above one another in a screen plane as viewed from the machine operating position, and wherein the at least one screen arranged hidden is arranged in a rear screen plane behind the two front screens, wherein the two front screens are spaced apart from one another so that the rear screen is visible sectionally through a viewing window between the two front screens.

3. The machine of claim 2, wherein at least three screens are arranged inclined at an obtuse angle to one another and are tilted differently toward the machine operating position.

4. The machine of claim 1, wherein at least two screens are arranged inclined at an obtuse angle to one another and are tilted differently than each other toward the machine operating position.

5. The machine of claim 1, further comprising a covering adjustment apparatus to change the hiding of a rear screen of the plurality of screens with respect to the size and/or location of a hidden section of the rear screen.

6. The machine of claim 5, wherein the covering adjustment apparatus has a movable support for the rear screen, and wherein the movable support movably supports at least one of the screens relative to at least one further screen such that the hiding of the rear screen is changeable with respect to the size and/or location of a hidden section of the rear screen.

7. The machine of claim 5, wherein the covering adjustment apparatus has a vertical adjustment apparatus for the adjustment of the height of the rear screen relative to the at least one screen in from of the rear screen.

8. The machine of claim 7, wherein the covering adjustment apparatus has a spacing adjustment apparatus for the moving apart and/or moving together of two front screens of the plurality of screens, wherein the front screens are in front of the rear screen and for the increasing and/or decreasing in size of the viewing window onto the rear screen, wherein the viewing window is formed between the two front screens.

9. The machine of claim 5, wherein the control device has a controller for the automatic adjustment of the screen covering independent of the game procedure.

10. The machine of claim 9, wherein the controller comprises a winnings displayer controller for the increasing in size of a visible screen section of the rear screen and/or for the cyclic moving to and fro of the rear screen upon the achieving of game winnings from the machine.

11. The machine of claim 1, further comprising an actuating drive comprising an electric motor for the adjustment of the position of at least one screen relative to at least one further screen.

12. The machine of claim 1, further comprising an inputter comprising an operating button actuable by a machine operator for the adjustment of a screen cover.

13. The machine of claim 12, further comprising an inputter comprising a manual button and/or a manual lever for the adjustment of the relative position of the screens to one another.

14. The machine of claim 1, further comprising a mirror associated with the rear screen, wherein the mirror is aligned and arranged with respect to the machine operating position such that at least a part of the image generated by the rear screen is visible in the mirror from the machine operating position.

15. The machine of claim 1, further comprising a mirror, wherein the rear screen is bordered to the right and to the left by the mirror which is arranged inclined at an acute or obtuse angle to the screen surface or the rear screen.

16. The machine of claim 1, wherein the screens are flat screens.

17. The machine of claim 1, wherein the screens comprise TFT monitors.

18. The machine of claim 1, further comprising a common machine housing comprising an operating panel for the actuation and/or control of the machine at the front side beneath the screens, and wherein the screens are arranged in the common machine housing.

19. The machine of claim 1, wherein the information comprises game contents and/or game information.

20. An entertainment machine, comprising:
a plurality of screens for the presentation of information, wherein the plurality of screens are directed toward a machine operating position;
a control device for the control of the screens and/or for the control of game procedures; and
an inputter comprising a foot pedal for the adjustment of the relative location of the screens to one another;
wherein at least one of the screens is a rear screen, and wherein the rear screen is arranged partly or fully hidden behind at least one further screen viewed from the machine operating position.

21. An entertainment machine, comprising:
a plurality of screens for the presentation of information, wherein the plurality of screens are directed toward a machine operating position;
a control device for the control of the screens and/or for the control of game procedures; and
an inputter comprising a knee pedal for the adjustment of the relative location of the screens to one another using the knee;
wherein at least one of the screens is a rear screen, and wherein the rear screen is arranged partly or fully hidden behind at least one further screen viewed from the machine operating position.

22. An entertainment machine, comprising:
a plurality of screens for the presentation of information, wherein the plurality of screens are directed toward a machine operating position; and
a control device for the control of the screens and/or for the control of game procedures;
wherein at least one of the screens is a rear screen, and wherein the rear screen is permanently arranged partly hidden behind at least one further screen, viewed from the machine operating position, and has a screen section visible from the machine operating position which screen section is outside said further screen; and
wherein at least two screens are arranged inclined at an obtuse angle to one another and are tilted differently than each other toward the machine operating position.

23. An entertainment machine, comprising:
a plurality of screens for the presentation of information, wherein the plurality of screens are directed toward a machine operating position, wherein at least one of the screens is a rear screen, and wherein the rear screen is permanently arranged partly hidden behind at least one further screen, viewed from the machine operating position, and has a screen section visible from the machine operating position which screen section is outside said further screen;
a control device for the control of the screens and/or for the control of game procedures; and
a covering adjustment apparatus to change the hiding of a rear screen of the plurality of screens with respect to the size and/or location of a hidden section of the rear screen.

24. An entertainment machine, comprising:
a plurality of screens for the presentation of information, wherein the plurality of screens are directed toward a machine operating position, and
a control device for the control of the screens and/or for the control of game procedures;
wherein at least one of the screens is a rear screen, and wherein the rear screen is permanently arranged partly hidden behind at least one further screen, viewed from the machine operating position, and has a screen section visible from the machine operating position which screen section is outside said further screen; and
wherein the control device has a controller for the automatic adjustment of a screen covering independent of the game procedure.

25. An entertainment machine, comprising:
a plurality of screens for the presentation of information, wherein the plurality of screens are directed toward a machine operating position;
a control device for the control of the screens and/or for the control of game procedures; and
an inputter comprising an operating button actuable by a machine operator for the adjustment of the screen cover;
wherein at least one of the screens is a rear screen, and wherein the rear screen is permanently arranged partly hidden behind at least one further screen, viewed from the machine operating position, and has a screen section visible from the machine operating position which screen section is outside said further screen.

26. An entertainment machine, comprising:
a plurality of screens for the presentation at information, wherein the plurality of screens are directed toward a machine operating position, wherein at least one of the screens is a rear screen, and wherein the rear screen is permanently arranged partly hidden behind at least one further screen, viewed from the machine operating position, and has a screen section visible from the machine operating position which screen section is outside said further screen;

a control device for the control of the screens and/or for the control of game procedures; and a mirror associated with the rear screen, wherein the mirror is aligned and arranged with respect to the machine operating position such that at least a part of the image generated by the rear screen is visible in the mirror from the machine operating position.

* * * * *